United States Patent [19]

Miekka et al.

[11] Patent Number: 6,068,691
[45] Date of Patent: May 30, 2000

[54] PROCESS FOR MAKING MACHINE READABLE IMAGES

[75] Inventors: Richard G. Miekka, St. Petersburg, Fla.; Dennis R. Benoit, Simpsonville, S.C.; Richard M. Thomas, Dyer; James P. Rettker, Glenwood, both of Ill.; Karl Josephy, Los Angeles, Calif.

[73] Assignee: Avery Dennison Corporation, Pasadena, Calif.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/939,183

[22] Filed: Sep. 29, 1997

Related U.S. Application Data

[60] Division of application No. 08/015,205, Feb. 9, 1993, Pat. No. 5,672,410, which is a continuation-in-part of application No. 07/882,174, May 11, 1992, abandoned.

[51] Int. Cl.[7] .......................... B02C 19/00; B22D 23/00; B22F 9/00

[52] U.S. Cl. .......................... 106/403; 75/356; 106/404; 164/46; 241/3

[58] Field of Search .......................... 164/46, 131, 477; 241/3; 75/356, 954; 106/403, 404

[56] References Cited

U.S. PATENT DOCUMENTS

| 2,701,901 | 2/1955 | Pawlyk ....................................... 164/46 |
| 2,839,378 | 6/1958 | McAdow .............................. 428/402 X |
| 2,941,894 | 6/1960 | McAdow ................................ 106/84 X |
| 3,181,209 | 5/1965 | Smith, Jr. ................................... 164/46 |
| 4,116,710 | 9/1978 | Heikel ...................................... 106/404 |
| 4,264,664 | 4/1981 | Kunz ........................................ 428/142 |
| 4,321,087 | 3/1982 | Levine et al. ............................. 75/356 |
| 4,481,999 | 11/1984 | Duchane et al. ...................... 164/46 X |
| 4,898,623 | 2/1990 | Pinkhasov .............................. 164/46 X |
| 5,011,638 | 4/1991 | Pinkhasov .............................. 164/46 X |
| 5,071,597 | 12/1991 | D'Amato et al. ......................... 264/1.3 |
| 5,126,529 | 6/1992 | Weiss et al. .......................... 164/46 X |
| 5,335,113 | 8/1994 | Jackson et al. .......................... 359/569 |
| 5,403,040 | 4/1995 | Mowry, Jr. et al. ....................... 283/91 |
| 5,428,479 | 6/1995 | Lee .......................................... 359/567 |
| 5,461,239 | 10/1995 | Atherton ................................ 250/566 |
| 5,521,030 | 5/1996 | McGrew ..................................... 430/1 |
| 5,624,076 | 4/1997 | Miekka et al. ......................... 164/46 X |

FOREIGN PATENT DOCUMENTS

| 0 081 599 | 2/1988 | European Pat. Off. . |
| 62-270703 | 11/1987 | Japan ........................................ 164/46 |
| 1238440 | 7/1971 | United Kingdom . |
| 1465908 | 3/1977 | United Kingdom ................... 164/131 |
| 2221870 | 2/1990 | United Kingdom . |

*Primary Examiner*—J. Reed Batten, Jr.
*Attorney, Agent, or Firm*—Christie, Parker & Hale, LLP

[57] ABSTRACT

Finely divided embossed metal particles are prepared by forming an embossment on a carrier surface in which the embossment comprises a machine readable image produced by a diffraction grating pattern, a holographic image pattern or an image visible solely by optical magnification. A layer of metal is applied to the surface so the layer adopts the complement or the embossment. The layer is then separated from the surface and reduced to embossed particles. Alternatively, the embossment can be formed on the carrier sheet directly or on the outer surface of a release coating formed on the carrier sheet. When removing the film of metal from the release-coated carrier, the carrier sheet with the release coating and film of metal can be passed through a release environment which causes the release coating to separate the film and carrier, but which is nondestructive of the metal. The metal particles can be collected in a solvent which is nonreactive with the metal, and the metal particles can be broken further into pigment particles. The diffraction grating can have from about 5,000 to about 11,000 grooves per cm.

20 Claims, 4 Drawing Sheets

PROCESS FOR MAKING MACHINE READABLE IMAGES

CROSS-REFERENCE TO RELATED APPLICATIONS

This application is a division of U.S. patent application Ser. No. 08/015,205, filed Feb. 9, 1993, and now U.S. Pat. No. 5,672,410 which is a continuation-in-part of U.S. patent application Ser. No. 07/882,174, filed May 11, 1992 and now abandoned.

FIELD OF THE INVENTION

This invention relates to a process for producing embossed metallic leaf pigments and to the use of these pigments in printing inks and coatings. More particularly, this invention relates to a continuous process for producing embossed, thin, bright metallic leaf pigments.

BACKGROUND OF THE INVENTION

The use of metal coatings for decoration and ornamentation began several thousand years ago. However, only within the last hundred years have metallic pigments become commercially important. Historically, the value of surfaces covered with gold or other metals resided not only in an aesthetically pleasing, bright, metallic finish, but in the ability of such surface coatings to withstand the ravages of time and weathering of the elements better than any other available type of surface coating. The high cost of gold or other metals, made it become difficult to produce a suitable thin leaf and the use of metallic coatings was limited to jewelry, porcelain, chinaware and other art objects. To produce thin leaf or coating of metal that was only a few thousandths of an inch thick, it was necessary to begin with a ductile metal that was already hammered into extremely thin sheets. These sheets were then interleaved with animal skins and further hammered until the resultant foil was fine enough to be used. During this process the edges of the thin leaf broke off into small particles. It was then found that by mixing these small fine flakes with a drying oil, a finish could be obtained that came close to resembling a continuous sheet of metal. The artisans who worked with this type of finish on a large scale prepared their metallic pigments by rubbing the finely hammered metal through a fine metal mesh.

During the mid 1800's, Bessemer produced the first practical and economical method to manufacture metallic flake pigments. This was accomplished by stamping or hammering metal sheets of appropriate brightness and then reducing the sheets into flakes which were graded and collected.

Charles Hall and Paul Herroult independently invented a practical aluminum smelting process in 1886 causing aluminum to be available in commercial quantities. Aluminum was technically adaptable to the Bessemer process, but the drawback was that it formed an explosive mixture with air over a wide range of metal-air ratios.

In 1925, Everett Hall was granted a number of patents for producing a safe and superior aluminum flake pigment. This Hall process, which employed a wet ball mill, carried out the size reduction of aluminum in the presence of a paint thinner containing a lubricant in solution. The lubricant was used to prevent heat cohesion of the fine flakes and the choice of lubricants determined the type of flake formed. In this process, the explosive potential from the finely powdered aluminum was minimized and a large scale commercial manufacturing process was developed. An example of the results of this invention was the paint used in 1931 to cover all structural parts of New York's George Washington Bridge.

In modern times, metallic coatings are obtained by using conventional aluminum flake and powder pigments which are formed as inks and then applied by printing methods. The metallic pigments are obtained by condensation of metallic vapors, electroplating, direct vacuum sputtering or transformed from foil leaf. The coatings using conventional aluminum pigments are gray, or, at best, are very low reflective coatings. The coatings are typically expensive, the processes difficult to control, and the processes do not lend themselves to high volume continuous coating applications. Examples of metallic coating compositions and processes for making metallic pigments are disclosed in U.S. Pat. No. 2,941,894 to McAdow, U.S. Pat. No. 2,839,378 also to McAdow, and U.S. Pat. No. 4,116,710 to Heikel.

Diagrams illustrating typical aluminum pigment production is described in FIG. 16 on p. 799 of Pigment Handbook, Volume 1, of J. Wiley & Sons, New York and FIG. 5 on p. 5 of Section FA2C-1, Powder and Pigments, July 1976, Alcoa Aluminum Pigments Products Data.

Aluminum pigments, prepared as described above, have been used in paints, enamels, lacquers and other coating compositions and techniques. The various grades of fineness of conventional aluminum pigments vary from relatively coarse particle sizes such as 250 microns (50 mesh) to about 44 microns (325 mesh).

A drawback of conventional aluminum and metallic pigments is their nugget-like shape. In formulating compositions containing the conventional shaped aluminum pigments, different particle sizes, concentrations as high as 30% by weight are usual. Due to the shape of the aluminum pigments particles, the particles tend to protrude from the surface of the ink or paint vehicle after drying, causing a phenomenon called "dusting" which occurs when the dried coating is rubbed, thereby removing some of the metallic residue. In addition, because the pigment particles do not lie flat and are randomly distributed, the plate out is usually not uniform and requires multiple coats or applications. An additional drawback is the milling entailed in the process of size reduction in which the original brightness of the metal deteriorates and the metal takes on a gray appearance.

Many of these shortcomings in traditional processes were significantly resolved by the process described in U.S. Pat. No. 4,321,087 to Sol Levine et al. The Levine et al. process produces very thin, bright metallic flakes with extremely smooth (mirror-like) surfaces. The flakes serve as excellent pigments and, when properly employed can offer metal-like or mirror-like optical effects.

In a parallel development, diffraction patterns and embossments, and the related field of holographs, have begun to find wide-ranging practical applications due to their aesthetic and utilitarian visual effects. One very desirable decorative effect is the iridescent visual effect created by a diffraction grating. This striking visual effect, attributed to Sir John Barton, Director of the British Royal Mint (circa 1770), occurs when ambient light is diffracted into its color components by reflection from a diffraction grating. A diffraction grating is formed when closely and regularly spaced grooves (5,000 to 11,000 grooves per cm.) are embossed on a reflective surface.

In recent times, this diffraction grating technology has been employed in the formation of two-dimensional holographic images which create the illusion of a threedimensional image to an observer. This holographic image technology can form very attractive displays. Furthermore, because the economics of forming holographic images is significantly dependent upon economies of scale, the concept of using holographic images to discourage counterfeiting has found wide application.

The original diffraction gratings were formed by scribing closely and uniformly spaced lines on polished metal surfaces using special "ruling engines." Subsequently, techniques were developed to reproduce a master diffraction grating by shaping a moldable material against the master diffraction grating surface. More recently, thermoplastic films have been embossed by heat softening the surface of the film and then passing them through embossing rollers which impart the diffraction grating or holographic image onto the softened surface. In this way, sheets of effectively unlimited length can be decorated with the diffraction grating or holographic image on a surface. The decorated surface of polymers is sometimes sufficiently reflective that the optical effect of the diffraction grating occurs without further processing, because the incident light is reflected by the facets of the decorated surface. Generally, however, the full optical effects require metallizing of the polymer surface. For the purpose of this application, the term diffraction grating includes holographic images that are based on diffraction grating technology.

It is the general object of the present invention to provide a process for making very thin, bright embossed metallic flake pigments rapidly and inexpensively.

Another object of the present invention is to provide metallic flakes embossed with a machine readable image, such as a conventional bar code image or a holographic bar code image.

Another object of this invention is to provide a process for continuously making embossed metallic flake pigments rapidly and inexpensively.

Another object of the present invention is to provide thin, bright, embossed metallic pigments.

Still another object of the present invention is to provide coating and printing formulations containing the thin, bright embossed metallic pigments of this invention.

Another object of the present invention is to provide an embossed organic or metallic flake useful for security applications.

These and other objects, features and advantages of the present invention will become evident from the following detailed description of the invention taken in conjunction with the drawings.

SUMMARY OF THE INVENTION

The objects of the present invention are achieved by a process in which an embossed surface is formed on or over at least one surface of a carrier sheet. The embossed surface is then metallized to form a thin metal film which conforms to the embossment. The film is then released from the embossed surface and comminuted to pigment flakes.

In the preferred process, a release coating is continuously applied to at least one side of a carrier sheet. The outer surface of the release coating is embossed or provided with a diffraction pattern. This embossment may form as an expression of an embossment already on the carrier, or may be formed on the release coating as it is applied to the carrier. Alternatively, the release coating may be applied in a smooth condition and then the embossment may be applied subsequently, either immediately or after a process delay. Metal vapor is condensed in the form of a thin film onto the embossed outer surface of the release coating. The carrier sheet, having the release coating and the thin metal film thereon, is then passed through a solvent system which dissolves the release coating or the carrier; allowing most of the metal film to float off the carrier sheet into the solvent without destroying the embossment on the metal film. The residual thin metal film is then wiped off the carrier sheet into a non-reactive liquid medium where it is dispersed into finer pigment particles by vigorous stirring or ultrasonics. The metallic pigment flakes may then be concentrated and formulated in coating and printing compositions.

In the same way, the invention contemplates the application of layers of optically-effective materials to the release coating to form optical stacks. Such sheets of embossed optical stacks could be used in sheets or reduced to pigment.

DETAILED DESCRIPTION

Figure 1:
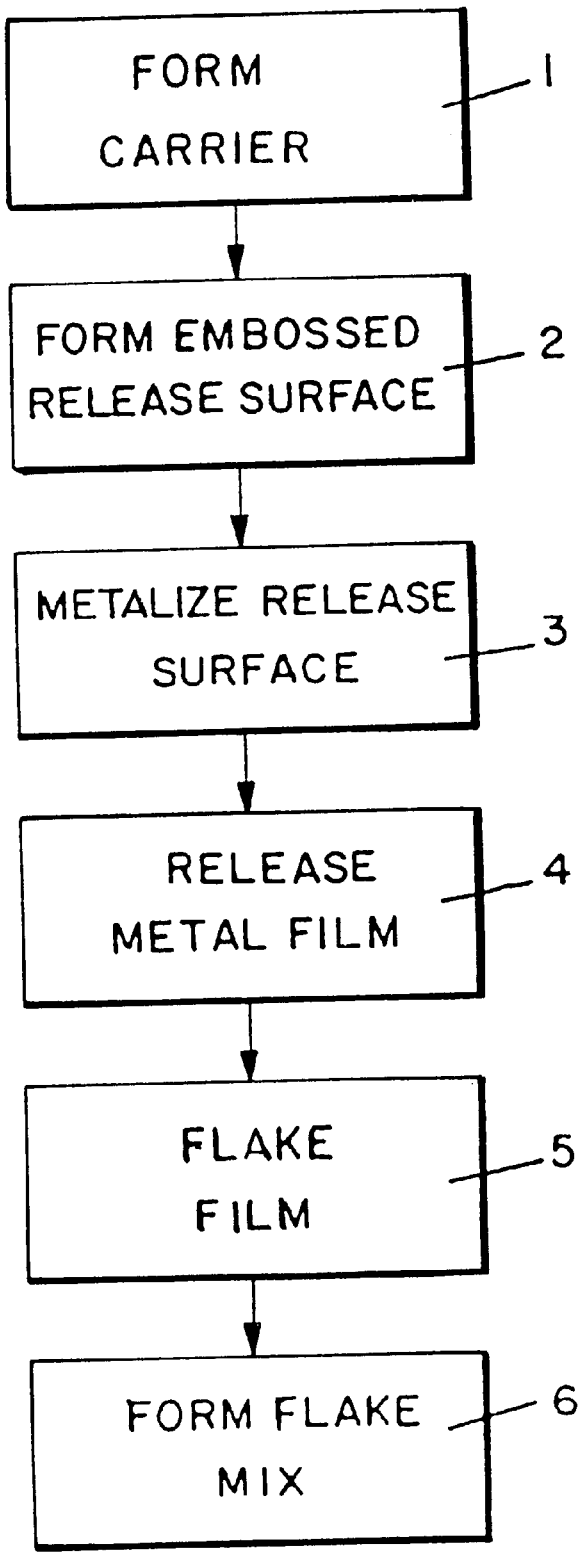
FIG. 1 is a block diagram of the process for producing the metal pigments of the present invention.

The general features of the present invention can best be visualized by considering FIG. 1, which is a flow chart symbolizing the steps of an embodiment of the present invention. In Step 1, the carrier sheet would be introduced into the process. Typically, the sheet would, in fact, be an elongated roll-to-roll belt or a continuous belt. In Step 2, an embossed release surface would be formed on the carrier. This could be integral to the carrier or could take the form of a separate layer on the carrier. The important thing is that the release surface must be embossed, and be capable of holding and then releasing a metal film formed on it. In Step 3, the metal film is formed on the release surface in such a way that the metal film adopts the complement of the embossment on the release surface. In Step 4, the release surface is actuated, causing the metal film and carrier to be separated from one another. In Step 5, the film is comminuted, preferably to the optimum size for ink pigment. In Step 6, the pigment or flake is mixed with complementary components to form useful compositions such as ink.

Figure 2:
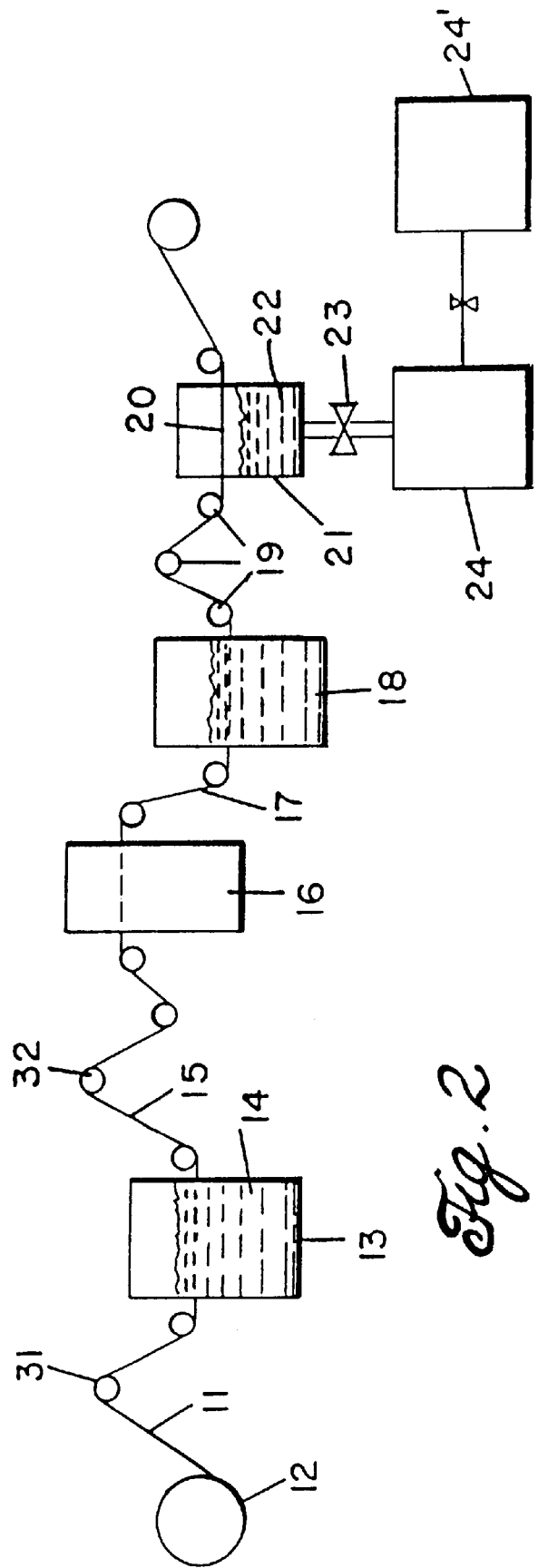
FIG. 2 is a schematic representation of the process.

Referring now to FIG. 2, a carrier sheet 11 is continuously dispensed from roll 12 and passed into coater 13, through a solution wherein a release coating 14 is applied to at least one side of carrier sheet 11. Station 31, upstream of the coat 13 and/or station 32, downstream of the coater 13 represent the processes by which an embossment is impressed on the outside surface of the release coating. For example, in the preferred embodiments, station 31 would merely be an idler roll, but station 32 would be an embossed roll which would emboss the outside surface of the release coat while it is in a softened condition. Coated carrier sheet 15 is then passed through a vacuum metallizing machine 16 and a thin metal film is deposited on at least one embossed release surface of the coated carrier sheet. As will be recognized by those familiar with the art of vacuum metallizing, step 16 will generally be carried out in a batch manner rather than continuously in the line as is shown conceptually in FIG. 2.

The metal-film coated carrier sheet 17 is passed through stripper 18 containing a solvent in which the release coating is soluble. The metal film-coated carrier sheet, having the release coating solubilized, is passed over rollers 19 and past a suitable wiper 20 in chamber 21, containing solvent 22. The wiper 20 totally removes the metallic film as thin flakes and the clean carrier sheet is rewound. The metallic flakes or pigments are allowed to collect in solvent 22 and may then be pumped by pump 23 to settling tank 24, 24'.

Carrier sheet 11 may be a polyester film, for example, a polyethylene terephthalate sheet, such as Mylar®, or other suitable sheet, such as cellophane or polypropylene or even paper.

Suitable release coatings include those materials which can be embossed (when appropriate) and are easily solubilized and on which the metal film may be deposited. Examples of such release coatings include polymers, such as polyvinyl chloride, polystyrene, chlorinated rubber, acrylonitrile-butadiene-styrene copolymer, nitrocellulose, methyl methacrylate, acrylic copolymers, fatter acids, waxes, gums, gels and mixtures thereof. In addition, up to 5% of a non-stick (adhesive) additive, such as silicon oil or fatty acid salt, may be added as an embossing aid. Application of the release coating can be performed by solubilizing the coating material in a suitable solvent and applying the resulting liquid with a standard continuous roll coating machine equipped to apply uniform thin coatings at commercially suitable speeds of 500 to 1000 feet per minute on one or both sides. The coated carrier sheet is preferably dried until the solvents are removed. A suitable machine is a general purpose rotogravure coater equipped with roll-to-roll unwind/wind system, such as the Two Position Rotogravure Coater and Drying Tunnel manufactured by Inta-Roto Inc. of Richmond, Va. Best results are obtained by applying release coating in quantities of from 0.1 to 5.0 lbs. per ream, preferably about 1.0 lb. to 2.0 lbs. per ream (3,000 square feet).

A critical part of this invention is the formation of the embossment on the outside surface of the carrier. While it is possible to carry out the metallizing directly on the embossed surface of the carrier, the results process are vastly improved by metallizing on an embossed separate release coating. There are essentially four modes by which this can be accomplished. Mode one involves forming the embossment simultaneously with the placement of the release coating on a pre-embossed carrier sheet. Mode two involves forming the embossment simultaneously with the placement of the release coating on a smooth carrier sheet. Mode three involves immediate subsequent embossing of the release coating before a significant change in its state has occurred. Mode four involves subsequent embossment after the release coating has undergone significant change of state.

Figure 3:
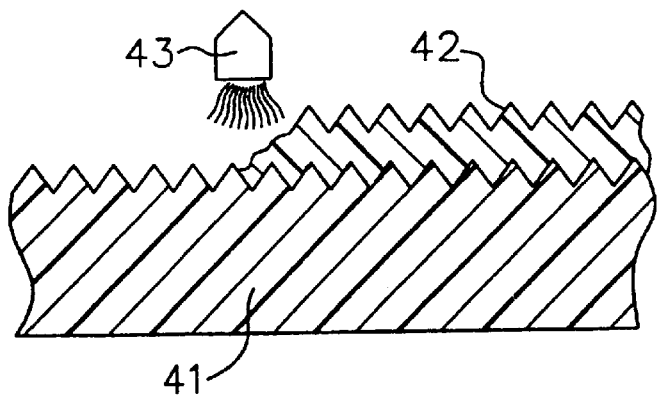
FIG. 3 is a schematic view of an embossing process employing the principles of the present invention.

The typical Mode one approach would involve the system shown schematically in FIG. 3. The carrier sheet 41 would bear a permanent embossment on one or both sides. The release coating 42 would be selected from those appropriate liquids that are film formers on the surface of the carrier, that is, the release material would, after application, by an applicator 43 form a thin layer, of uniform thickness, that would follow the carrier surface, including the embossment. In this way, the embossment on the carrier would be expressed and duplicated on the outside surface of the release coating 42.

The appropriate amount of release coating can be expressed as a range of volume % solids in the pre-applied coating liquids, for example, vinyl chloride-vinyl acetate copolymer in a volatile carrier. The functional range is 0.1 to 10% and the preferred range is 0.5 to 1.5%.

The amount of release coating can also be expressed as gms. of solid per square meter of carrier surface area, calculated as if the carrier were flat, that is, projected area. The functional range is 0.01 to 1 and the preferred range is 0.05 to 0.15.

Figure 4:
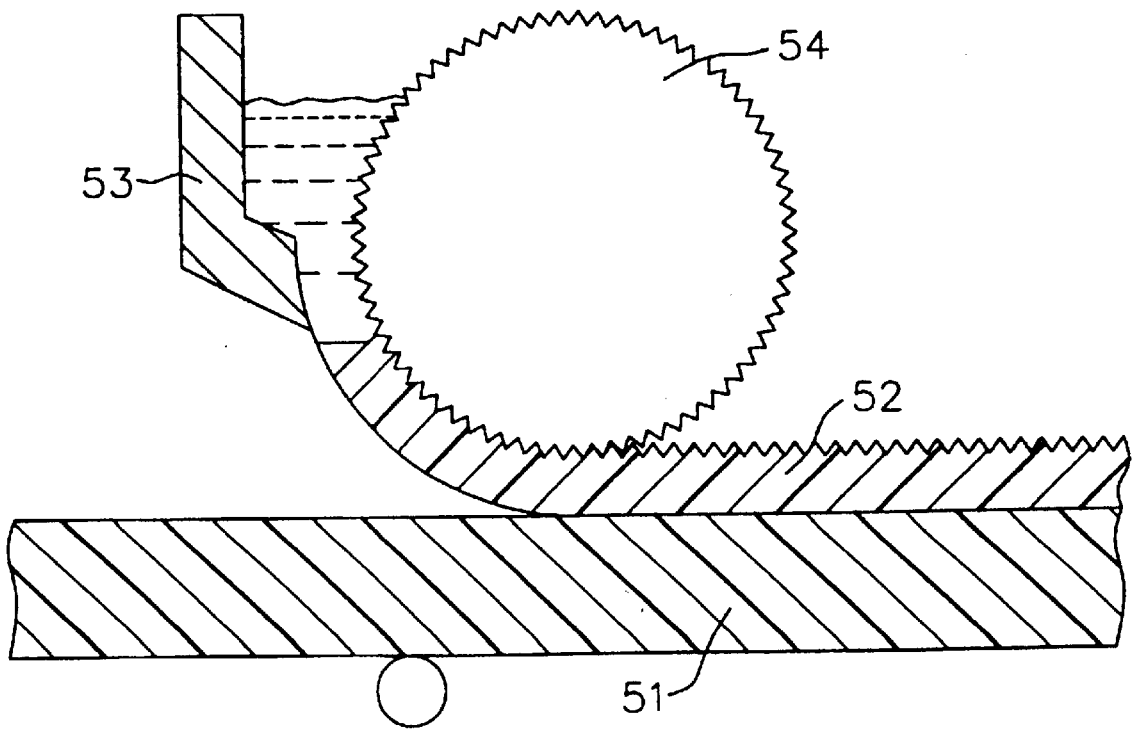
FIG. 4 is a schematic view of a second embossing process.

The typical Mode two system would involve applying the release coating 52 to the carrier 51 by means of a liquid ink tank 53 and 54, or a general purpose rotogravure coater or reverse roll, or an embossed printing roller, as shown in FIG. 4.

Figure 5:
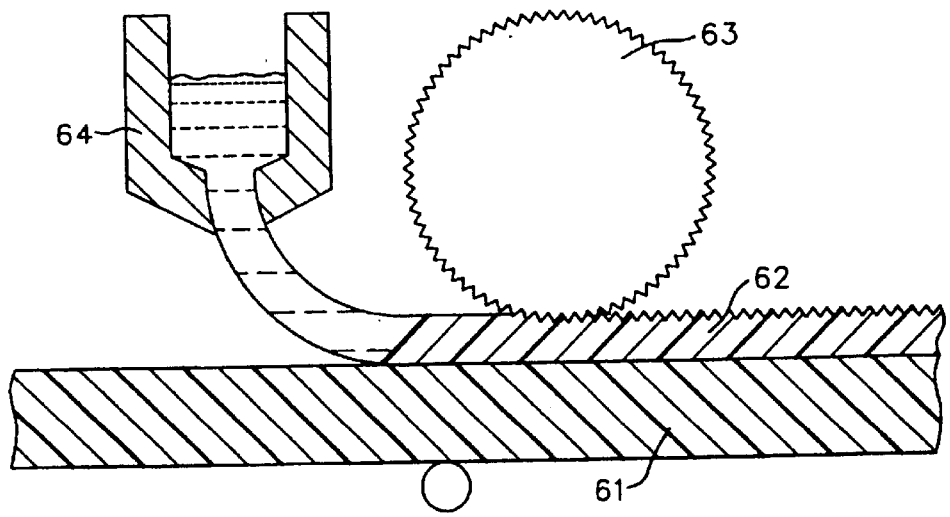
FIG. 5 is a schematic view of a third embossing process.

The typical Mode three system would apply the release coating 62, in a dissolved or molten state from a coating tank 64, to the carrier 61, and then, while the coating 62 is still impressionable, the embossing would take place. FIG. 5 shows an embossment roll 63 embossing the still soft coating.

Figure 6:
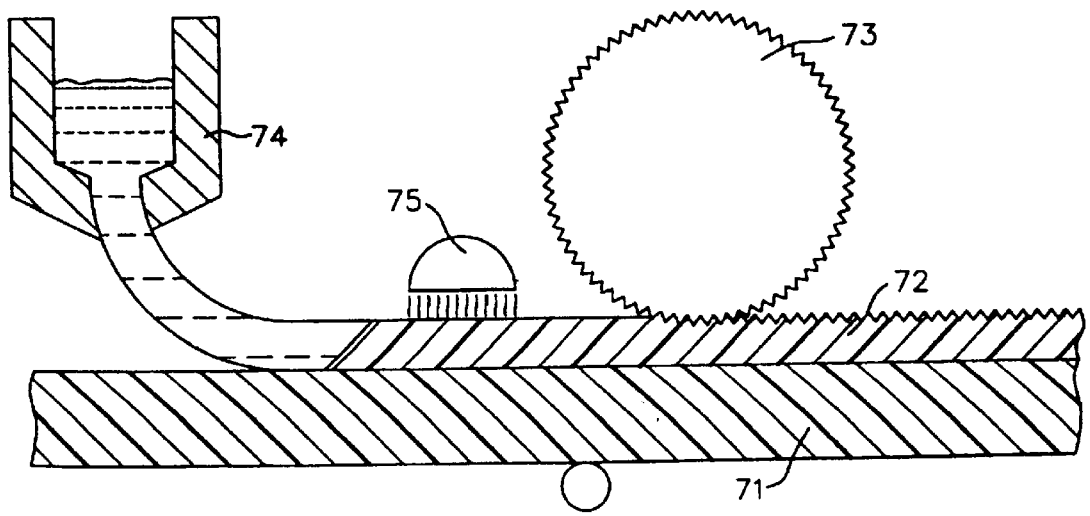
FIG. 6 is a schematic view of a fourth embossing process.

The typical Mode four system would allow the coating 72 to stabilize, that is, dry if it were applied as a solution or dispersion, or solidify if it were applied as a melt. Then, if necessary, the release coating would be again rendered impressionable, and the embossment is applied as shown in FIG. 6. In FIG. 6, the release coating 72 is applied, from a tank 74, to the carrier 71, as a solution and a heating lamp 75 drives off the solvent, while simultaneously softening the coating so it can be embossed by the embossing roller 73.

The patterns which would be preferably formed using the above-described technique would typically be of three types. Type one would be various diffraction and/or holographic patterns that exhibit desirable optical effects such as iridescence. These could be used for decorative application, but could also have anti-forgery applications. This would include machine readable patterns that function as bar codes. Type two would include tiny images that would only be visible under optical magnification. These could be very effective in anti-forgery applications. Type three would include tiny holographic images that could only be visible under optical magnification. This would include machine readable images such as holographic bar codes. These could also be very effective in anti-forgery applications.

After the embossed surface is formed, the coated carrier film 15 is passed through a vacuum metallizing machine 16 and a metal film is deposited on one or both sides of the release coating. The thickness of the deposited metal film is from 100 to 500 angstroms and is controlled by the speed of the web and the power required for the evaporation rate. Suitable bright metals for deposition include aluminum, chromium, copper, steel, silver and gold. Also of particular interest in anti-forging applications would be highly inert alloys of Nichrome or of nickel.

The vaporization of the metal is carried out using such standard methods as induction, resistance, electronic beams and sputtering. The thickness of the deposited metal film is important to obtain the bright particles. An extremely uniform, thin film is necessary to obtain maximum leafing properties. To obtain the desired continuous reflectiveness of aluminum particles, the most preferred thickness of the film is from 250 to 450 angstroms. The optimum thickness will vary depending on the metal used.

If desired, the carrier sheet having the thin metal film deposited thereon is stretched under tension by approximately 1 to 2% of its length causing cracks to form in the metal surface. This process is referred to as energizing and permits about a two-fold acceleration of the subsequent stripping process.

The metallic-coated carrier sheet 17 is then passed into a solvent tank 18 containing the solvent in which the release coating is solubilized. Suitable solvents for solubilizing the release coating include acetone, chlorinated solvents such as methylene chloride, methyl ethyl ketone, methyl isobutyl ketone, toluene, butyl acetate and the like.

The metallic film coated carrier sheet is passed through solvent tank 18 and over a series of rollers 19 and past an air knife 20 or a suitable wiper which removes loose metal particles from the carrier sheet. The air knife may be in the same chamber 18 as the solvent but usually is in a separate chamber 21, as shown in FIG. 2, containing a solvent 22, which solvent may be the same solvent as in tank 18. It is essential that the solvent be non-reactive with the metallic pigment. A suitable air knife can be formed from a hollow tube fitted to a source of compressed air of approximately 90 PSI. Nozzles or fine holds are machined laterally and equally spaced along its length so when assembled the air jets project at a tangent to the moving carrier sheet. The air jets remove all residual metallic flakes that may remain on the film. The air knife also acts as a drying mechanism for the wetted carrier sheet thereby aiding in rewinding. In addition it may be desirable to use a vapor degreasing technique to totally remove both residual metal and release coating from the carrier sheet prior to rewinding. The vapor degreasing also cleanses any residual release coating from any remaining metal flakes. The air may be ambient, chilled or heated for optimum efficiency.

The solvent in tank 18 may be used until saturated. The solvent may then be recovered from the solution containing the coating material. The coating material can be reused in a subsequent coating operation if it is properly purified.

The pigment dispersed in the solvent is either allowed to settle in stripping tank 21 or transported by pump 23 to settling tanks 24, 24' or passed through a centrifuge so that a concentrated suspension of thin bright metallic pigment is obtained.

The metallic pigment is then broken up into platelets with an average diameter of about 25 to 50 microns. A preferred means for reducing the pigment to the proper particle size is a sonolator which operates by ultrasonic action and thereby does not destroy the reflectivity of the bright surface of the pigment particles. A suitable ultrasonic dispersion is the Triplex Sonolator System, Model A HP, Type A, Design 150 made by the Sonic Corp. of Stratford, Conn.

The thin, bright metallic pigment having a diameter from 25–50 microns is then concentrated to a pigment solids of from 5 to 15%. The concentrated pigment may then be formulated into a spray lacquer or a printing ink.

It has, however, been found preferable to further concentrate the metallic pigment by first using a solvent exchange with, for example, methyl cellosolve, followed by further concentration in a centrifuge wherein the metallic solids are collected at approximately 10%. This concentrate is then made into a lacquer or printing ink formulation in a metal concentration from 1.0–5.0% by weight of the metal. The embossment present on each individual flake of pigment, in random orientation, primarily in two-dimensions, creates a unique iridescent effect if the embossment is a diffraction pattern or hologram. Under optical magnifications, the individual flakes and their embossment can be seen.

The metallic film obtained in this process resembles the brilliance, reflective gloss, and hiding power of commercial metallic foils. Due to the natural orientation of the single layer leafing flake, even when embossed, small amounts of pigment will cover very large surface areas.

The following examples illustrate the practice of the above-described invention.

EXAMPLE 1

An aluminum pigment was made in the following manner. A release coat comprising 10% polystyrene in toluene was coated onto a ½ mil. thick Mylar® carrier sheet with a 200 line quad rotogravure roll on a commercial roll coater and dried, leaving a glossy film of polystyrene on the carrier sheet. The film was then embossed by heating the coated film to 170° C. which is above the softening temperature of polystyrene, then pressing the outer surface of the release coat with an embossed roller bearing a diffraction pattern. The roll surface was dolled below softening temperature of the cot and driven with a surface speed equal to the carrier sheet. The embossed coated carrier sheet was then metallized on a Vacuum Roll Coater applying 300±200 angstroms of thickness of aluminum film. This metallized, coated carrier sheet was then passed through a stripping machine and a suspension of aluminum flakes was collected having a concentration of about 0.1% by weight of aluminum flakes. Solvents used in the stripping process were composed of 50% toluene and 50% methyl ethyl ketone (MEK). The aluminum flake containing a suspension was then allowed to settle out and further concentrated to about 6% solids. The resulting particles exhibit the optical effects of diffraction and optical magnification establishes that each particle or sheet has the diffraction pattern embossed on its surface.

EXAMPLE 2

A ½ mil thick Mylar® carrier sheet was coated with a 10% polystyrene solution in a commercial roll coater machine using a 100 line rotogravure roller. A second coating of molten polyethylene was subsequently applied on top of the polystyrene by an embossed printing roller which left an embossment on the outer surface of the second coating. The coated carrier sheet was then metallized with 300±150 angstroms of aluminum and the metallized carrier sheet stripped in a bath comprised of hot heptane. The metal particles were then concentrated to 6% solids aluminum. The resulting particles exhibit the optical effects of diffraction and optical magnification establishes that each particle or sheet has the diffraction pattern embossed on its surface.

EXAMPLE 3

Example 1 was repeated except that ½% by wt. of Dow Corning Q4 Silicone Oil (relative to dry polystyrene) was added to the coating before application to the film. Embossing was accomplished very readily. The resulting particles were the same as obtained by Example 1.

EXAMPLE 4

Example 1 was repeated except that, after metallization, the metal was coated with 1% solution of polystyrene in toluene and dried, followed by remetallization without reembossing. After the second metallization, the embossed pattern was still clearly visible on the outer surface. This doubly-metallized coated carrier sheet was then passed through a stripping machine and a suspension of aluminum flakes was collected having a concentration of about 0.1% by weight of aluminum flakes. Solvents used in the stripping process were composed of 50% toluene and 50% methyl ethyl ketone (MEK). The aluminum-flake-containing suspension was then allowed to settle out and further concentrated to about 6% solids. The resulting particles exhibit the optical effects of diffraction and optical magnification establishes that each particle or sheet has the diffraction pattern embossed on its surface. In this case, twice as many flakes were obtained as in Example 1 yet only one embossing step was used.

EXAMPLE 5

Example 1 was repeated except that the pattern on the embossing roller was a matrix or triangular logos, 15 microns on each side and 1 micron in relief height. The triangles were spaced about 10 microns apart and were arranged in a regular repeated pattern in two dimensions. The resulting flakes were not iridescent, but the logos were clearly visible on the individual flakes at 100× magnification.

EXAMPLE 6

A ½ mil thick cellophane carrier sheet was coated with an acrylic copolymer dissolved in toluene in an amount of approximately 1.0 lb. per ream. The copolymer was then embossed. The coated sheet was subsequently metallized with 350±100 angstroms of aluminum and then stripped with a solution comprising 50% toluene, 40% MEK and 10% acetone. The aluminum flakes stripped easily and were bright. The resulting particles exhibit the optical effects of diffraction and optical magnification establishes that each particle or sheet has the diffraction pattern embossed on its surface.

EXAMPLE 7

A ½ mil thick polyester carrier sheet was coated on a commercial machine with about 1.0 lb. per ream per side of a release coating comprising a mixture of methyl methacrylate resin and acrylic copolymer dispersed in 50% MEK and 50% toluene. The coated sheet was then embossed and then metallized with copper about 400 angstroms thickness. The release coat was solubilized with methylene chloride and the thin bright copper particles were collected. The resulting particles exhibit the optical effects of diffraction and optical magnification establishes that each particle or sheet has the diffraction pattern embossed on its surface.

EXAMPLE 8

A ½ mil thick polyester carrier sheet was coated on both sides with approximately 1.25 lbs. per ream of polystyrene dispersed in toluene. The coated carrier sheet was then embossed and then metallized on both sides with 350±100 angstroms thickness of aluminum. The metallized carrier sheet was then stripped by dissolving the release coating in a solvent which comprised 45% MEK, 45% toluene and 10% acetone. The thin aluminum particles were collected in the solvent mixture. The resulting particles exhibit the optical effects of diffraction and optical magnification establishes that each particle or sheet has the diffraction pattern embossed on its surface.

EXAMPLE 9

A ½ mil thick Mylar® carrier sheet was coated with polystyrene at about 1.0 lbs. per ream per side on a commercial coating machine, then embossed, and then metallized with approximately 350±100 angstroms thickness of chromium. The polystyrene release coating was solubilized with a solution of 50% MEK and 50% toluene and the chromium flakes were stripped from the carrier sheet. The resulting particles exhibit the optical effects of diffraction and optical magnification establishes that each particle or sheet has the diffraction pattern embossed on its surface.

EXAMPLE 10

Products obtained from each of the earlier examples were placed in a centrifuge and spun at 13,000 to 16,000 rpm for 5 minutes. A pigment concentration of approximately 10 to 20% by weight of pigment was obtained when the supernate was removed. The resulting particles exhibit the optical effects of diffraction and optical magnification establishes that each particle or sheet has the diffraction pattern or logo embossed on its surface.

EXAMPLE 11

The metallic pigments of each of the earlier examples, obtained from the processing of Example 7, were passed through a sonolater using a 21 gap orifice. At least 90% of the particles were examined and found to have peripheral dimensions ranging from 25 to about 50 microns in diameter. Of course, the thickness of the particles remained about 350±100 angstroms. These metallic pigments were further concentrated to approximately 10% and passed through an ultrasonic dispenser and were uniformly reduced to a pigment dimension of between 10 to 29 microns. The resulting particles exhibit the optical effects of diffraction and optical magnification establishes that each particle or sheet has the diffraction pattern or logo embossed on its surface.

EXAMPLE 12

The aluminum pigments of Example 10 treated according to Example 11 were formulated into a printing ink having the following formulation:

|  | Amount |
| --- | --- |
| Aluminum pigment (on solids basis) | 5 gms. |
| Nitrocellulose | 1 gm. |
| Stearic Acid | 5 gms. |
| Methyl/ethyl cellosolve 60%/40% | 93.5 gms. |

A printing ink of this formulation using 300 line screen roller then calendered with polished steel rollers at approximately 180° F. exhibited the same effect as applying hot stamping foil or aluminum foil to a laminated board, except that the surface exhibits the optical effect (iridescence) of a diffraction pattern and optical magnification establishes the presence of the pattern.

EXAMPLE 13

An aluminum pigment made according to the process of this invention was made into a spray lacquer of the following formulation:

|  | Amount |
| --- | --- |
| Aluminum pigment | 1 gram |
| Acrylic Binder | 0.5 grams |
| Wetting agent | 0.1 gram |
| Methyl/ethyl cellosolve 50%/40% | 98.4 grams |

One gallon of lacquer basis on this formulation was found to satisfactorily yield approximated 350,000 to 400,000 square inches of sprayed surface when using conventional spray equipment. The resulting product exhibited the same effect as applying hot stamping foil or aluminum foil to a laminated board.

While in order to obtain maximum coating effects and compatibility in printing, coating, lacquer and paint products, a fine particle size is usually required to obtain a highly reflective film, it is possible to use larger metallic leaf for other purposes. By reducing or eliminating the ultrasonic dispersion is possible to obtain a sparkle-like effect at lower concentrations of pigments, and the resulting material is suitable for certain applications.

A particular type of pigment which would have application in the inks of the present invention is called an optical stack and is described in U.S. Pat. No. 4,168,986 to Joseph J. Venis, entitled, "Method for Preparing Lamellar Pigments," and U.S. Pat. No. 5,084,351 to Roger W. Philips et al., entitled, "Optically Variable Multilayer Thin Film Interference Stack on Flexible Insoluble Web." The teachings of both of these patents are incorporated herein by reference.

By precisely controlling the thickness of layers of optically-effective materials and the formation of optically-effective layer boundaries, interesting and useful optical effects can be produced when light impinges on the optical stack.

Of particular interest for this invention would be a process of making optical stack pigment flakes that are initially formed on an embossed carrier (or embossed carrier-release layer). In that way, the optical stack would carry the embossment. The stack could be formed on the embossed carrier either with the front surface against, or away from the carrier. Furthermore, the layer adjacent the carrier may be applied to fill the embossment so that subsequent layers have parallel boundaries and/or the first layer may be a supplemental cover layer which simply places an embossed cover on the rest of the stack. Alternatively, the stack layers can be laid on so that each follows the embossment or proportionally follows the embossment (i.e., uniform frequency but reduced amplitude). When the stack is removed from the carrier and employed as a pigment, the optical effects of the stack and embossment on each stack particle would occur. This invention would also include forming the optical stack on an embossed transparent or opaque substrate surface and using the resulting product, in sheet form, with or without the substrate, for various decorative or security items.

It is apparent that many widely varying embodiments of the process and product of this invention can be made without departing from the scope thereof, and it is not intended that the invention be limited except by the appended claims.

What is claimed is:

1. A process for preparing finely divided metal particles, each of which has at least one embossed surface, comprising the steps of:
    (a) providing a carrier sheet having a first side and a second side;
    (b) applying a release coating onto at least one side of the carrier sheet, said coating having an inside surface and an outside surface, with an embossment comprising machine readable image produced by a a diffraction grating pattern, a holographic image pattern, or an image visible solely by optical magnification;
    (c) depositing, in the form of a thin film having an inside surface and outside surface, a metal onto said outside surface of said release coating, so that the inside surface of the film adopts the complement of the embossment of the outside surface of the release coating;
    (d) passing said carrier sheet with said release coating and said film of said metal through a release environment which causes the said release coating to separate the film and carrier but which is non-destructive of said metal;
    (e) removing said film of said metal from said carrier sheet in a particulate form to produce the metal particles substantially free of said release coating, and collecting the metal particles in a solvent which is non-reactive with said metal, and
    (f) breaking the metal particles into pigment particles.

2. A process as recited in claim 1, wherein the metal film is applied in an amount from 100 to 500 angstroms thickness.

3. A process as recited in claim 1, wherein the pigment particles have an average particle size diameter between about 10 and 50 microns.

4. A process according to claim 1, wherein said film of said metal is deposited on said release coating by vaporizing said metal and then condensing it.

5. A process according to claim 1, comprising the further steps of:
    further concentrating said metal pigment particles from step (f) to produce a solids concentration of from 5% to 15%; and
    reducing said pigment particles to a particle size diameter between about 10 and 20 microns.

6. A process according to claim 1, wherein said step of breaking said metal particles is performed by ultrasonic agitation of said metal particles.

7. A process according to claim 5, wherein said step of reducing said pigment particles is performed by ultrasonic dispersion of said pigment particles.

8. The process according to claim 1, in which the diffraction grating has from about 5,000 to about 11,000 grooves per cm.

9. A process for preparing finely divided embossed metal particles, comprising the steps of:
    (a) forming an embossment on a carrier surface, wherein said embossment comprises a machine readable image produced by a diffraction grating pattern, a holographic image pattern or an image visible solely by optical magnification;
    (b) applying a layer of metal to the surface so that the layer adopts the complement of the embossment;
    (c) separating the layer from the surface; and
    (d) reducing the layer to embossed particles.

10. A process according to claim 9, wherein the layer of metal is applied in an amount from 100 to 500 angstroms thickness.

11. A process according to claim 9, wherein the pigment particles have an average particle size diameter between about 10 and 50 microns.

12. The process according to claim 9, in which the diffraction grating has from about 5,000 to about 11,000 grooves per cm.

13. A process for preparing finely divided particles, each of which has at least one embossed surface, comprising the steps of:
    (a) providing a sheet having a first side and a second side, at least one side of which has an embossment, in which said embossment comprises a machine readable image produced by a diffraction grating pattern, a holographic image pattern, or an image visible solely by optical magnification;

(b) depositing, in the form of a thin film having an inside surface and outside surface, an optically-effective material onto said embossment, so that the inside surface of the film adopts the complement of the embossment;

(c) passing said sheet with said film of said material through a release environment which causes said film to separate from the sheet but which is non-destructive of said material, and (d) removing said film of said material from said sheet in a particulate form to produce the particles, and collecting the particles in a solvent which is non-reactive with said material.

14. A process as recited in claim 13, wherein the optically-effective material is a metal.

15. A process as recited in claim 13, wherein the optically-effective material is an optical stack.

16. A process as recited in claim 13, wherein the optically effective material consists of a plurality of layers of optically-effective compounds.

17. A process as recited in claim 13, wherein the optically-effective material is an optically variable multilayer thin film interference stack.

18. The process according to claim 13, in which the diffraction grating has from about 5,000 to about 11,000 grooves per cm.

19. The process according to claim 13, wherein the metal film is applied in an amount from 100 to 500 angstroms thickness.

20. The process according to claim 13, wherein the pigment particles have an average particle size diameter between about 10 and 50 microns.

* * * * *